United States Patent [19]
Ghaffari et al.

[11] Patent Number: 6,088,740
[45] Date of Patent: Jul. 11, 2000

[54] COMMAND QUEUING SYSTEM FOR A HARDWARE ACCELERATED COMMAND INTERPRETER ENGINE

[75] Inventors: Bahareh Ghaffari, Denver; Kenneth J. Gibson, Boulder, both of Colo.

[73] Assignee: Adaptec, Inc., Milpitas, Calif.

[21] Appl. No.: 08/988,016

[22] Filed: Dec. 10, 1997

Related U.S. Application Data

[63] Continuation-in-part of application No. 08/906,369, Aug. 5, 1997, Pat. No. 5,931,920.
[51] Int. Cl.[7] .................................................. G06F 12/00
[52] U.S. Cl. ............................. 710/5; 710/112; 710/39; 710/54; 710/263
[58] Field of Search ..................... 710/5, 40, 52, 710/54, 112, 263, 39; 711/109, 110

[56] References Cited

U.S. PATENT DOCUMENTS

| | | | |
|---|---|---|---|
| 4,136,386 | 1/1979 | Annunziata et al. | 711/119 |
| 5,459,839 | 10/1995 | Swarts et al. | 710/112 |
| 5,530,815 | 6/1996 | Nabekura et al. | 712/227 |
| 5,781,182 | 7/1998 | Liu et al. | 345/96 |
| 5,822,772 | 10/1998 | Chan et al. | 711/158 |
| 5,874,930 | 2/1999 | McRobert et al. | 345/44 |

*Primary Examiner*—Ayaz R. Sheikh
*Assistant Examiner*—Ario Etienne
*Attorney, Agent, or Firm*—Duft, Graziano & Forest, P.C.

[57] ABSTRACT

A hardware implemented command queuing system in a hardware accelerated command interpreter engine. The command queuing system is an integral component of an autonomous hardware accelerated command interpreter type data processing engine that executes a programmable set of data processing commands in response to a stimulus from a host processor. The command queuing system is a configuration of registers and logic blocks that interact with a local host processor and other components within the command interpreter engine itself. The local host processor generates the commands to execute and the command queuing system queues the commands for seriatim execution by components within the command interpreter system. The command queue is a set of registers and command queue pointers that point to the next register available for writing a new command to the command queue, the next register that contains a command that is ready for executing, and the next register that contains the address of a completed command awaiting acknowledgment. The command queue pointers are managed by command queue interface control logic in the command queuing system. In the event of an error in executing any one command from the command queue, the command queuing system interacts with the local host processor to update the command queue pointers as needed to recover from the error and restart normal command queuing. The command queuing system also includes a set of control registers that contains internal command interpreter system operational status and local host processor accessible queuing and error status. The set of control registers are also managed by the command queue interface control logic in the command queuing system.

17 Claims, 13 Drawing Sheets

COMMAND QUEUING SYSTEM FOR A HARDWARE ACCELERATED COMMAND INTERPRETER ENGINE

RELATED APPLICATIONS

The present application is a Continuation-In-Part of U.S. patent application Ser. No. 08/906,369 filed Aug. 5, 1997 U.S. Pat. No. 5,931,920, the text of which is incorporated herein by reference to the same extent as though the text were actually present.

FIELD OF THE INVENTION

The present invention relates to data processing engines, and more particularly to a command queuing system for a hardware accelerated command interpreter that fetches and executes low level commands on behalf of at least one higher level hardware and/or software host or host device system.

BACKGROUND OF THE INVENTION

An Input/Output (I/O) controller is a system that manages the detailed operations required to move data from a source location to a destination location at the request of a local or remote computing device. A local computing device can include, but is not limited to, an internal host processor that controls an I/O bus that is used by the I/O controller. A remote computing device can include, but is not limited to, an external host processor that has access to a local computing device and/or an I/O bus that is used by the I/O controller. A source location and a destination location of data being moved by the I/O controller can both exist on the same I/O bus or on at least two separate I/O busses, and can be any combination of computing entity including, but not limited to, a local or remote computing device and a local or remote data storage device.

One persistent problem with existing I/O controllers is that moving data to and from data storage devices by way of I/O busses is a relatively slow process compared to the processing speeds of even an average processor or Central Processing Unit (CPU) that eventually manipulates the data. For this reason, there is an ongoing need for faster and more efficient techniques of moving data between computing devices and/or data storage devices.

A preferred solution to optimizing the performance and efficiency of data processing engines generally and I/O controllers specifically, is the improved command interpreter system as disclosed in the document or documents cited in the above identified section titled "Related Applications." The improved command interpreter system is a hardware accelerated data processing engine, also known generally as a sequencer, that queues and executes low level commands that when chained together perform larger complete tasks such as the writing of data to a magnetic disk storage device. However, a data processing engine can only execute discrete commands quickly and efficiently if the commands and their accompanying data are readily available for executing and error recovery when necessary. For this reason, there exists a long felt need for a fast and efficient system for queuing commands in the context of an autonomous hardware accelerated data processing engine. A solution to this problem as disclosed in this document has heretofore not been known.

SUMMARY OF THE INVENTION

The above identified problems are solved by the Command Queuing System of the present invention for use in a hardware accelerated Command Interpreter (CI) engine. The Command Queuing System is an integral component of an autonomous hardware accelerated CI type data processing engine that executes a programmable set of data processing commands in response to a stimulus from a host processor in a host device. The CI itself is comprised of registers and supporting hardware implemented logic blocks that include a Command Queuing System, a logic unit, a multi-purpose interface, at least one local memory, and a controlling state machine, that each operate in concert without direct software control. A host device that requests the completion of specific commands by the CI can be a software controlled processor environment. However, the type and purpose of specific commands a host device might deliver to the CI for execution are beyond the scope of the present disclosure but are not limited by the Command Queuing System disclosed in the present invention. The locations of data operated on by the CI are beyond the scope of the present discussion. One purpose of the Command Queuing System in the CI is to manage command queuing and command execution in coordination with the host device so that the host device does not need to keep track of anything other than what commands it has written to the Command Queuing System for execution and what commands have completed executing successfully and/or unsuccessfully by the CI.

The Command Queuing System is a configuration of registers and logic blocks that interact with a host device and other components within the CI itself. The host device generates the commands to execute and the Command Queuing System queues the commands for seriatim execution by components within the CI system. The Command Queue itself is a set of registers and Command Queue Pointers that point to the next register available for writing a new command to the Command Queue, the next register that contains a command that is ready for executing, and the next register that contains the address of a completed command awaiting acknowledgment. The Command Queue Pointers are managed by Command Queue Interface Control logic in the Command Queuing System. In the event of an error in executing any one command from the Command Queue, the Command Queuing System interacts with the host device to update the Command Queue Pointers as needed to recover from the error and restart normal command queuing.

The Command Queuing System also includes a set of Control Registers that contain internal CI system operational status and host device accessible queuing and error status. The set of Control Registers are also managed by the Command Queue Interface Control logic in the Command Queuing System.

DETAILED DESCRIPTION

Figure 1:
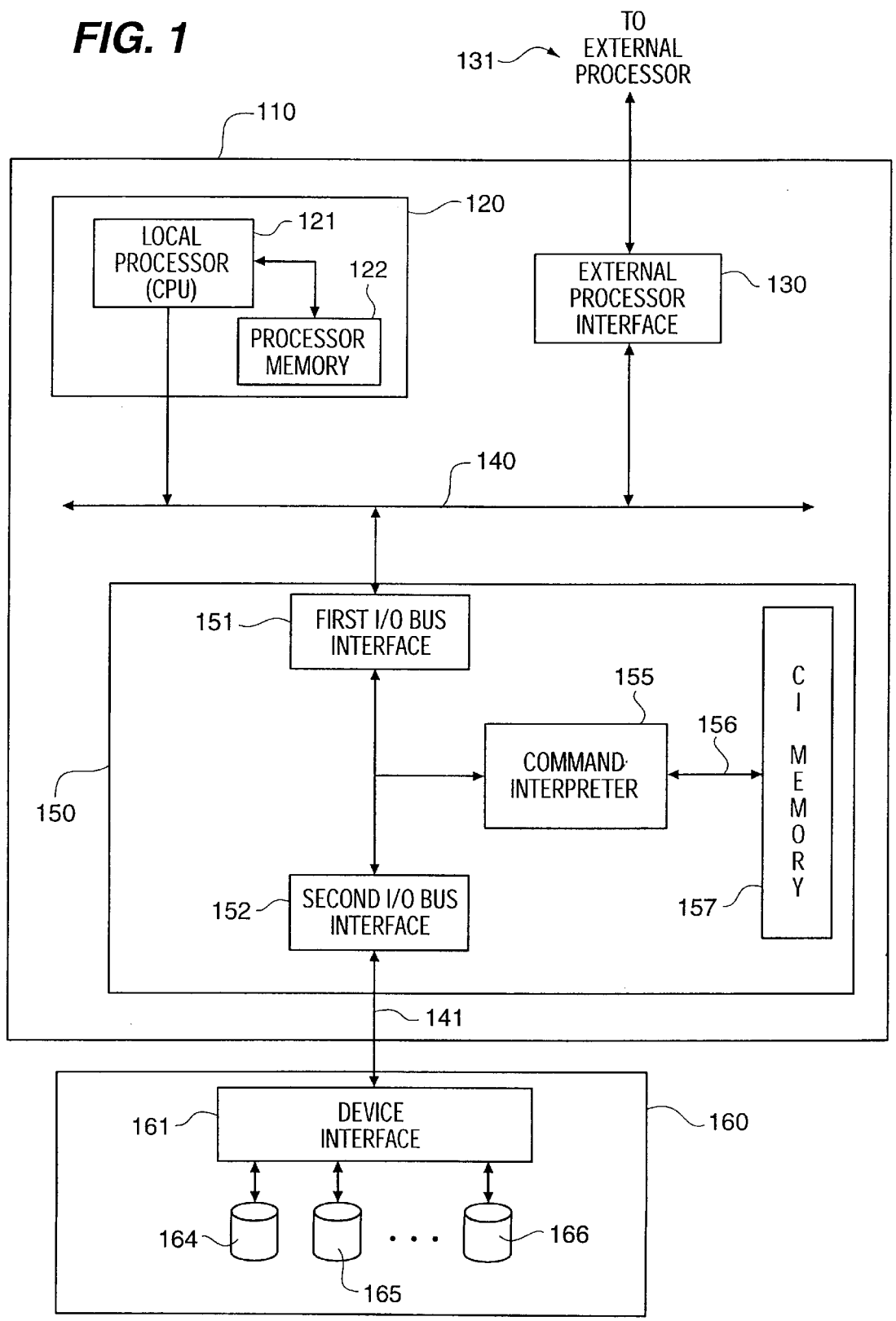
FIG. 1 illustrates a system level block diagram view of a computing system with an I/O controller and the CI.
Figure 2:
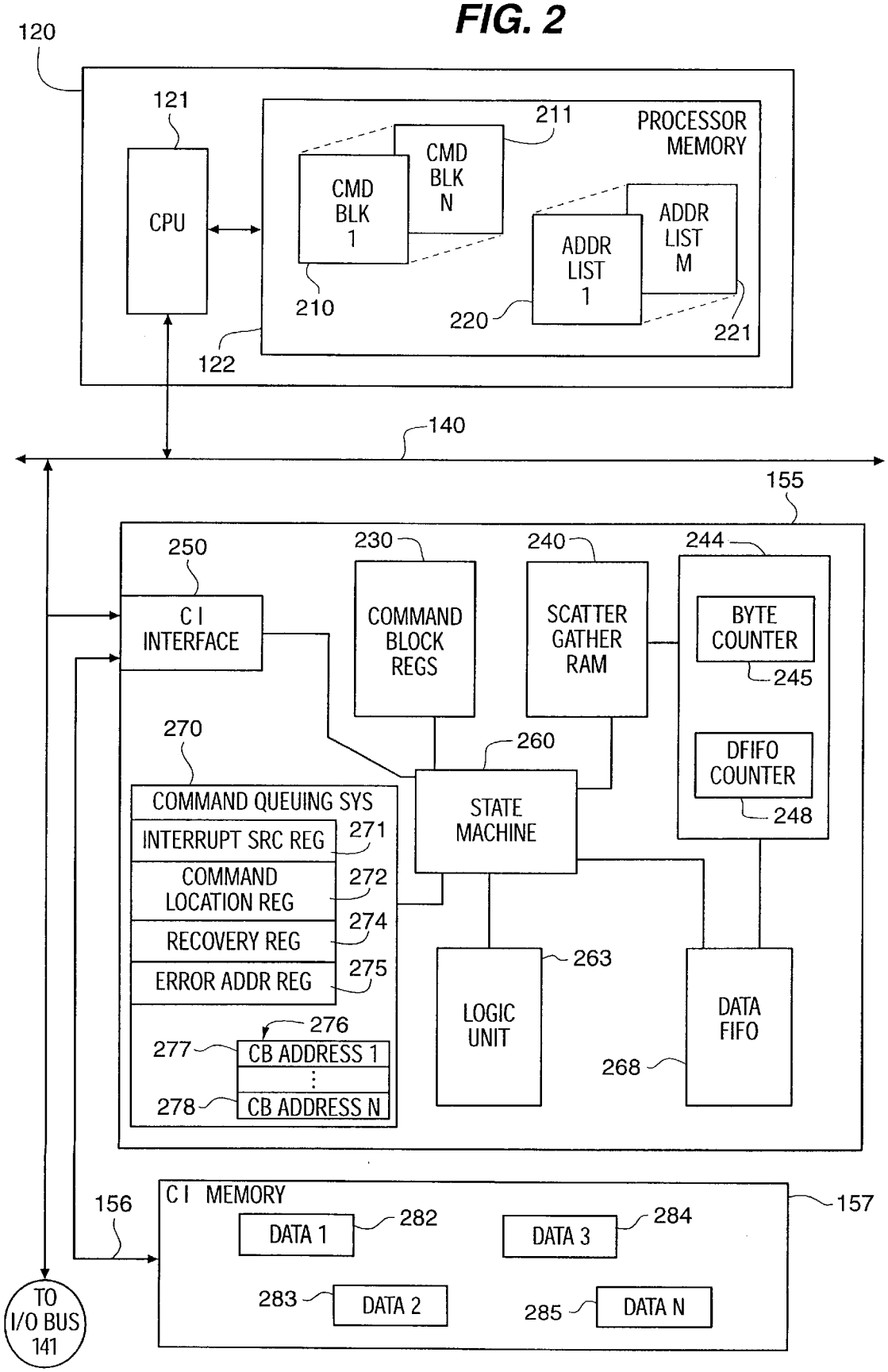
FIG. 2 illustrates details of the CI and local host processor in block diagram.

Architectural Overview FIGS. 1–2 FIG. 1 illustrates a system level view of a computing system 100 in the context of a RAID system. Using a RAID system as the basis for the present illustration is for example purposes only and is not intended as a limitation on the applicability of the present invention to other uses and/or inclusion in other computing system configurations. For example, the I/O controller 150 that includes the CI 155 of the present invention can be implemented in many different contexts including, but not limited to, a device controller context as in the present RAID system example, an I/O bridge context between two I/O busses, a basic I/O controller context having access to only one I/O bus, or any other I/O bus configuration.

The primary components of computing system 100 include, but are not limited to, a computing device 110 and a storage device 160. Components of storage device 160 include, but are not limited to, a magnetic disk device interface 161 also known in the context of the present example as a RAID interface, and a disk array comprised of multiple magnetic disk devices 164–166.

Components of computing device 110 include, but are not limited to, a local processor complex 120, an external processor interface 130, a first and second I/O bus 140 and 141 respectively, and an I/O controller 150. Components of local processor complex 120 are operatively connected to the first I/O bus 140 and include, but are not limited to, a local host processor memory 122, and a local processor 121 also known as a CPU, software controlled host or host device. External processor interface 130 is operatively connected to the first I/O bus 140 and an external processor 131 in a manner that supports communication connectivity between the external host processor 131 and the first I/O bus 140. Components of I/O controller 150 include, but are not limited to, a first I/O bus interface 151 to first I/O bus 140, a second I/O bus interface 152 to second I/O bus 141, and a CI 155 between the first and second I/O bus interfaces 151 and 152 respectively. CI 155 is operatively connected to a memory 157 by way of memory bus 156 for use as a cache during data manipulations and/or data transfer operations. Details of CI 155 components are disclosed in the text accompanying FIG. 2. The memory 157, also known as a cache, CI memory, or I/O controller memory, is typically a volatile memory such as any of a variety of Random Access Memory (RAM) types including, but not limited to, a Dynamic RAM (DRAM) or preferably a Synchronous DRAM (SDRAM) that are both well known and widely available commercially in the industry.

FIG. 2 illustrates the component details of the CI 155, local processor complex 120, and I/O controller memory 157, in block diagram form. Local processor complex 120 includes the components as stated in the text accompanying FIG. 1. The processor memory 122 of the local processor complex 120 is illustrated with contents including a set of n Command Blocks 210–211 and m scatter/gather address lists, the fields of which are disclosed in the text accompanying FIGS. 5–6.

The CI 155 is a programmable, hardware accelerated, non-processor driven data processing engine having state machine control comprised primarily of memory and registers interconnected by gated logic blocks. Because the CI 155 does not include software control intelligence, the CI 155 is driven by gated signals in response to commands and/or specified register bits that are supplied by a source external to the CI 155. The external source of commands that drive the CI 155 can include, but is not limited to, the local processor complex 120 or any other source accessible to the CI 155 by way of I/O busses 140 and/or 141. Timing for the CI 155 is obtained from any one of two sources depending on the operation taking place. Interactions with the I/O bus 140 use the bus clock frequency. Interactions with the I/O controller memory 157 use the memory's clock frequency. Appropriate clock synchronization is made in any manner well known in the art to facilitate continuity of activities within the CI 155 that cross clock boundaries. The following discussion includes a disclosure of the fundamental CI 155 components in block diagram form. Details of the operational interactions among the fundamental CI 155 components are disclosed in the text accompanying FIGS. 7–14.

The fundamental CI 155 logic block components include, but are not limited to, the CI Interface 250, Command Block Registers 230, Scatter/Gather (S/G) RAM 240, State Machine 260, Command Queuing System 270, Logic Unit 263, and a Data First-In-First-Out (DFIFO) 268. State Machine 260 is the main control logic block for interactions and/or data transfers among the CI 155 components listed above, in addition to controlling interactions and/or data transfers between any CI 155 component and an external computing device and/or data storage device that is accessible to CI 155 by way of I/O busses 140 and 141. State Machine 260 control is accomplished in part by implementing the operational logic disclosed in the text accompanying FIGS. 3–14.

CI Interface 250 includes interfaces specific to any external I/O bus and the CI I/O controller memory 157 in addition to a general front end or internal interface for the CI 155 components. The portion of CI Interface 250 that acts as an interface to an external I/O bus includes the logic necessary to communicate with the I/O bus to which it is connected in that it can operate at the I/O bus clock frequency and pre-fetch bus addresses to maintain a zero wait state for Direct Memory Access (DMA) operations. The portion of CI Interface 250 that acts as an interface to the I/O controller memory 157 includes the logic necessary to communicate with the memory to which it is connected in that it can operate at the memory clock frequency and address and track the location of data written to and read from the I/O controller memory 157. The portion of CI Interface 250 that acts as an interface to the internal CI 155 components includes the logic necessary to communicate with either the external I/O bus interface or the memory interface regardless of the potential differences in clock frequencies.

Command Block Registers 230 include at least one register to store the contents of specific fields of a Command Block. Details of a Command Block are disclosed in the text accompanying FIG. 5. Command Block Registers 230 also include a command decoder to determine the operation to perform for a given command.

Scatter/Gather (SG) RAM 240 is an internal or external storage area for CI 155 that holds lists of source locations and destination locations of data being operated on by the CI 155. The preferred SG RAM 240 is an internal storage area for reasons of improved performance. The lists of data locations are pointed to by Scatter/Gather Lists (SGLists), the details of which are disclosed in the text accompanying FIG. 6. SG RAM 240 is also accompanied by Tracking Counter 244 that contains the logic and registers necessary to determine the number of bytes being transferred for each SG element. The Tracking Counter 244 includes a Byte Counter 245 and a DFIFO Counter 248. The DFIFO Counter 248 counts the number of bytes transferred to or from DFIFO 268. The Byte Counter 245 counts the total number of bytes that have been requested by at least one SG List.

Command Queuing System 270 includes the logic and registers that are necessary to maintain at least one Command Queue Register 277–278 in a Command Queue 276. The preferred command queuing scheme is First-in-First-out, however, any other queuing scheme can be used. The Command Queue Registers 277–278 contain the location of individual Control Blocks that exist in locations external to CI 155. Control Registers 271–275 are used to control CI 155 and/or pass information between the local processor 121 and CI 155. Relevant Control Registers include, but are not limited to, Interrupt Source register 271, Command Location register 272, Recovery Register 274, and Error Address register 275. Additional details of the Command Queuing System 270 are disclosed in the text accompanying FIGS. 9–14.

Logic Unit 263 includes the logic and registers necessary to perform logical operations on data. The logical operation being performed on the data is controlled and/or coordinated by State Machine 260.

DFIFO 268 includes the logic and/or registers necessary to sequentially store and retrieve data being input and output during specific data manipulation operations and as data is being stored and retrieved from the larger I/O controller memory 157. Preferably, DFIFO 268 is a minimum size interleaved RAM that is at or about 512 k bytes.

Figure 3:
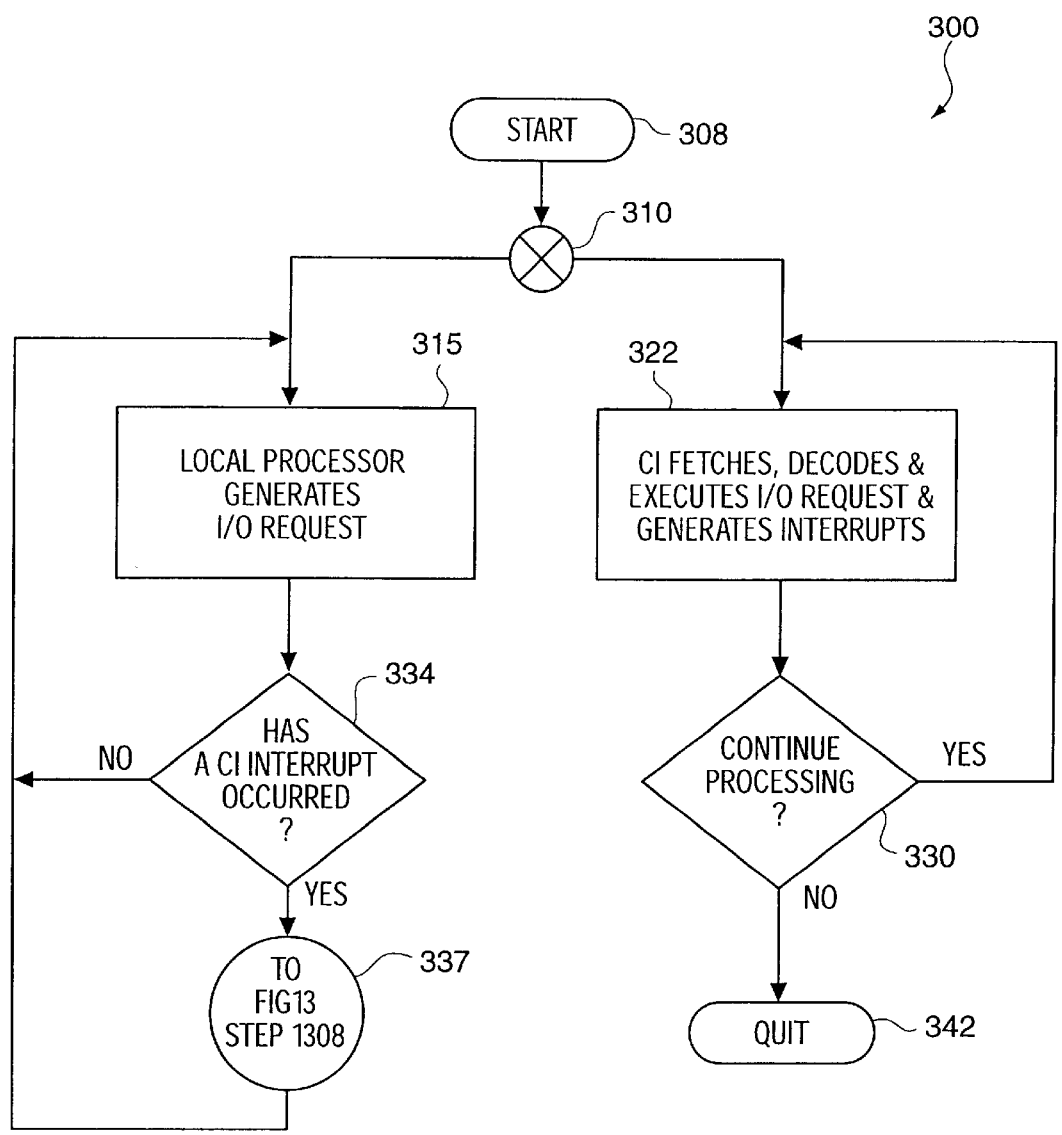
FIG. 3 illustrates the operational steps in flow diagram form for the improved CI system of the present invention operating in concert with the local host processor.

CI Operational Overview FIG. 3

FIG. 3 illustrates an overview of the operational steps 300 in flow diagram form for the Command Queuing System 270 of the CI 155 acting concurrently and in concert with the software controlled local processor 121. The operational steps 300 begin at step 308 and proceed to branch point 310 where CI 155 and local processor 121 act in concert and typically concurrently since they are both independently functioning components.

The sequence of steps beginning with step 315 are performed by the local processor 121. At step 315, an I/O request is generated by the local processor 121 on behalf of a requesting entity such as the local processor 121 itself or an external processor 131. An I/O request for purposes of the present discussion is a request to manipulate data, or read data or write data from a source location to a destination location. Both the source location and the destination location must be accessible by way of at least one common I/O bus. For example in the context of FIG. 1, the source and destination locations of data can both be on I/O bus 140. Similarly, the source and destination locations of data can be on separate I/O busses 140 and 141 respectively where both busses 140 and 141 are accessible by way of an I/O bus bridge provided by I/O controller 150. Details of the I/O request generating steps are disclosed in the text accompanying FIGS. 4–6. Local processor 121 continues the activities disclosed in step 315 until such time as an interrupt occurs from the CI 155 as disclosed in the text accompanying step 334.

If it is determined at decision step 334 that the CI 155 has generated an interrupt to signal the completion of a presently executing command, then processing continues at step 337. The details of step 337 are disclosed in the text accompanying FIG. 13. Upon completion of the operational steps 1300 in FIG. 13, processing continues from step 337 to the operational step 315 as previously disclosed. Alternatively, if it is determined at decision step 334 that no interrupt from the CI 155 exists, then local processor 121 continues at operational step 315 as previously disclosed.

The sequence of operational steps beginning with step 322 are performed by the CI 155. At step 322, the CI 155 portion of the I/O controller 150 fetches, decodes, and executes the specific tasks required to complete the I/O request previously generated at step 315. Details of the steps associated with fetching, decoding, and executing an I/O request by the CI 155 are disclosed in the text accompanying FIGS. 7–14. If at any time it is determined at decision step 330 by the CI 155 that I/O request processing should continue, then processing continues at step 322 as previously disclosed. Alternatively, if it is determined at decision step 330 by the CI 155 that I/O request processing should not continue, then processing stops at step 342.

Figure 4:
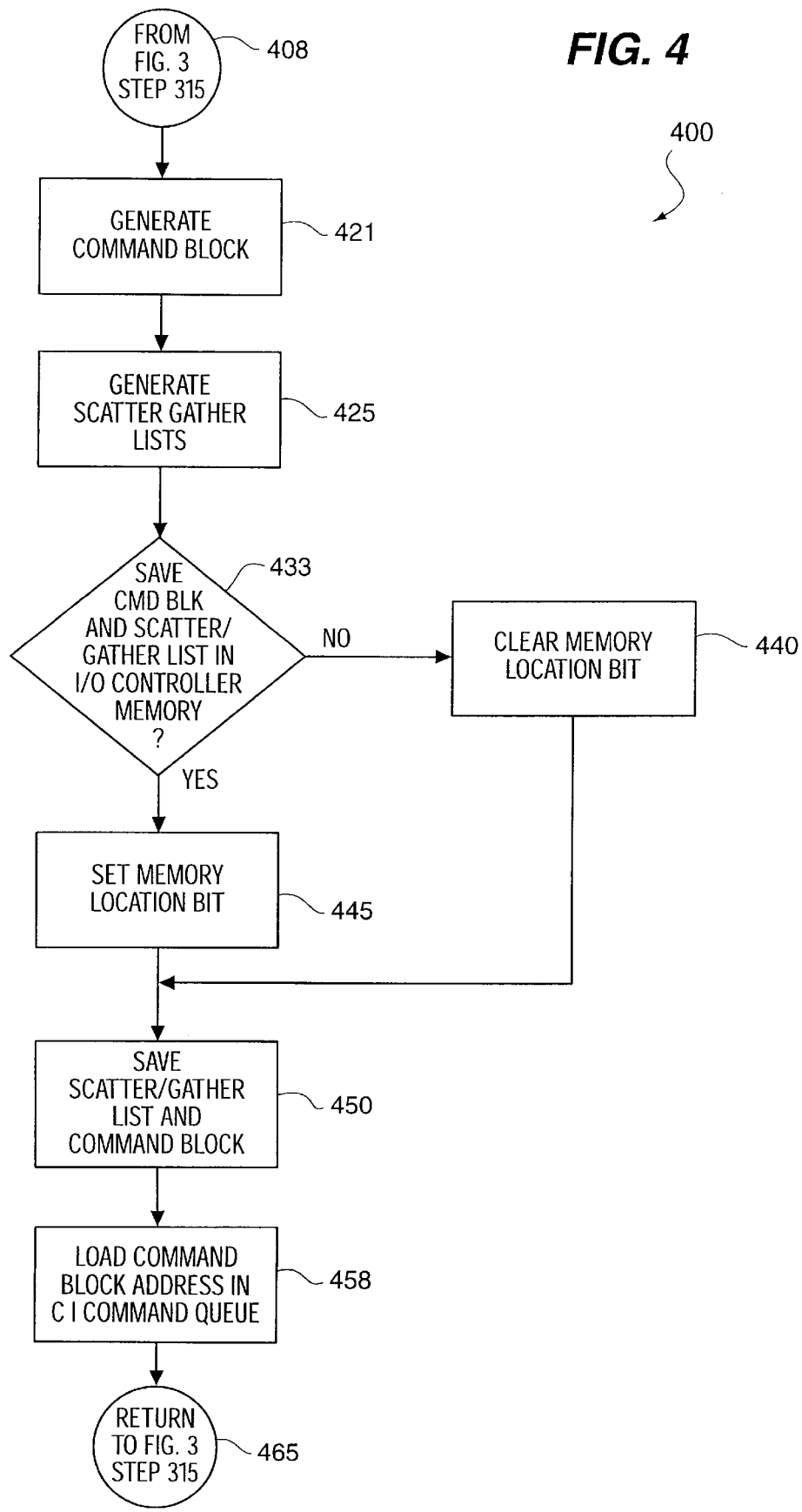
FIG. 4 illustrates the operational steps in flow diagram form for generating an I/O request for execution by the CI.
Figure 5:
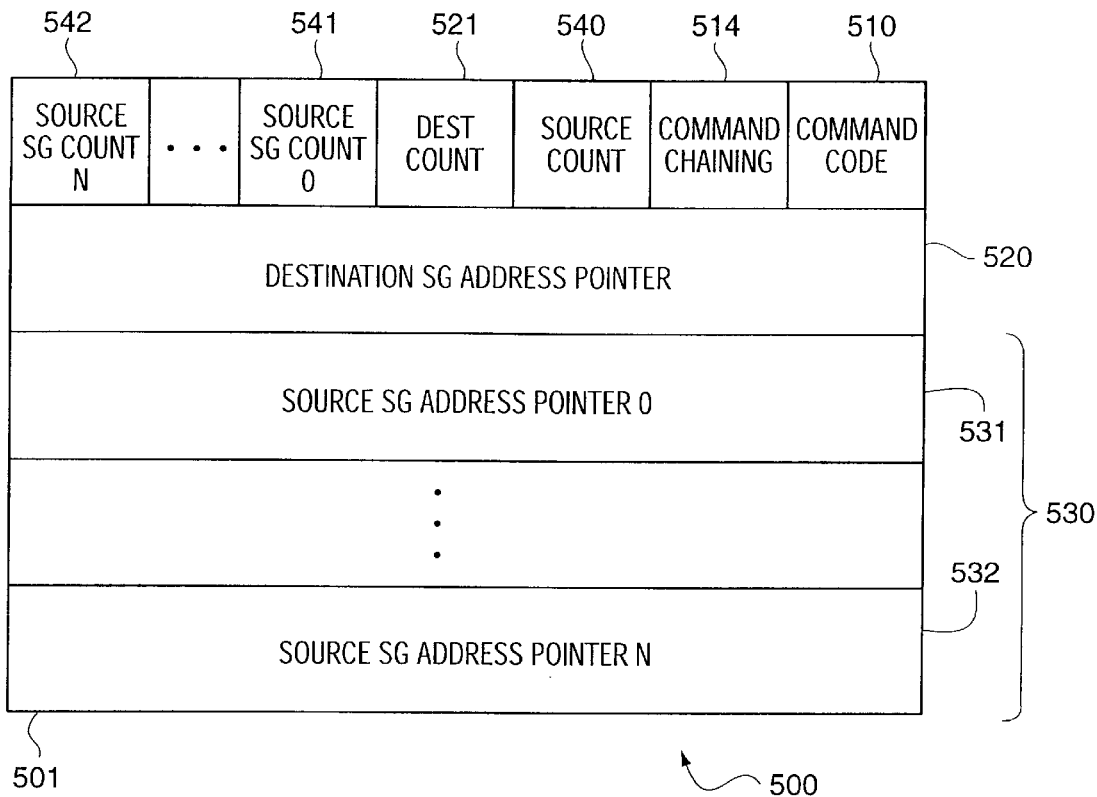
FIG. 5 illustrates a detailed field layout example of a Command Block.
Figure 6:
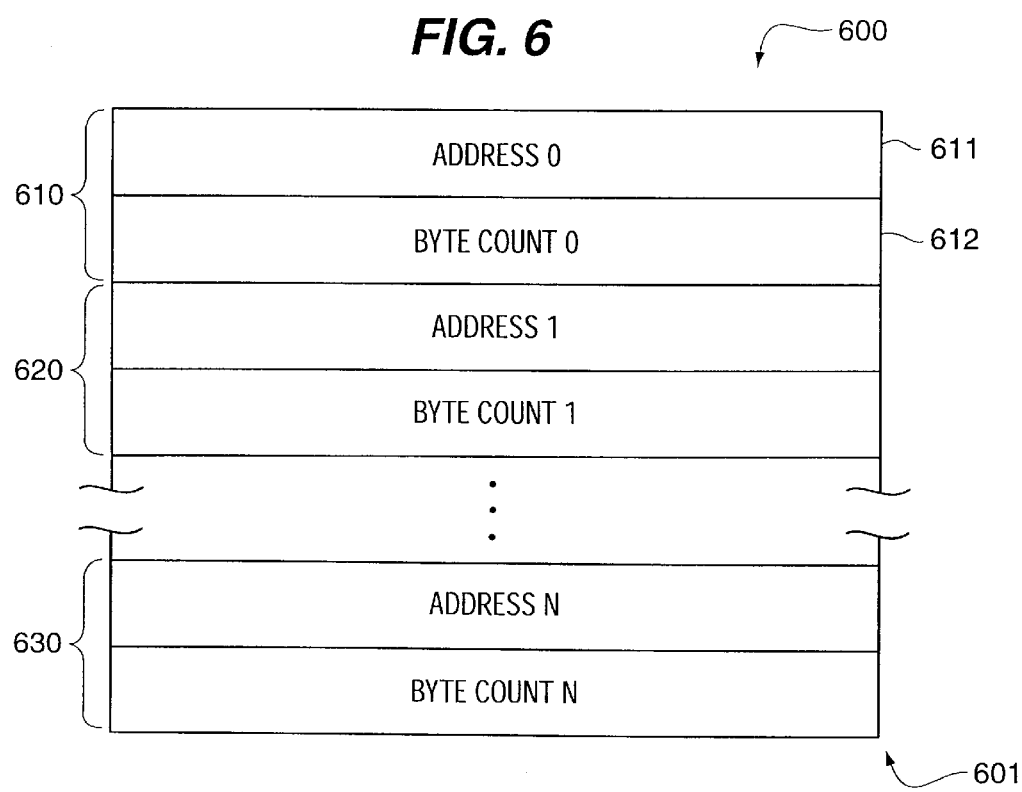
FIG. 6 illustrates a detailed example of Scatter/Gather List fields pointed to by a Command Block.

Generating An I/O Request—FIGS. 4–6

FIG. 4 illustrates the operational steps 400 in flow diagram form for generating an I/O request for execution by the CI 155. The operational steps 400 begin at step 408 and are the details of step 315 in FIG. 3. The operational steps 400 are performed by the local processor 121 on behalf of itself or in cooperation with an external processor 131. At step 421, the local processor 121 generates a Command Block on behalf of the entity responsible for a given I/O request. A Command Block contains information necessary for the CI 155 to execute the request. The contents of a Command Block can include, but are not limited to, the specific I/O command to execute and pointers to the relevant source and/or destination data locations. Details of the fields in an example Command Block are disclosed in the text accompanying FIG. 5.

A Scatter/Gather List corresponding to the Command Block of step 421, is generated at step 425 by either the local processor or an external processor. A Scatter/Gather List contains pointers to the source and/or destination locations of data being operated on by the I/O operation identified in the corresponding Command Block. Details of the fields in an example Scatter/Gather List are disclosed in the text accompanying FIG. 6.

Depending on the memory location where the entity requesting the I/O operation intends to store the Command Block and corresponding Scatter/Gather Lists generated in steps 421 and 425, the CI 155 must know how to interpret the location address being provided by the requesting entity. Any means of communicating this location information is considered within the scope of the present invention. One way to communicate the location information is to use a bit in a register that indicates whether the Command Block and Scatter/Gather Lists are in a memory local to the CI 155 or not. For example, if it is determined at decision step 433 that the Command Block and Scatter/Gather List of steps 421 and 425 are being saved in I/O controller memory local to the CI 155, then the Memory Location bit in the Command Location register 272 is set at step 445 to communicate the location information to the CI 155. Alternatively, if it is determined at decision step 433 that the Command Block and Scatter/Gather List of steps 421 and 425 are being saved in non-I/O controller memory external to the CI 155, then the Memory Location bit in the Command Location register 272 is cleared to communicate the location information to the CI 155. At step 450, the Command Block and accompanying Scatter/Gather List or lists are saved in a memory location as specified by the Memory Location bit.

At step 458, the local processor that generated the Command Block loads the Command Block address directly into the Command Queue 276. Loading a Command Block address in the Command Queue 276 signals the CI 155 to begin processing an I/O request if processing is not already in progress. The I/O requests are typically processed in a FIFO manner. Additional details of the Command Queuing System 270 are disclosed in the text accompanying FIGS. 9–10. The operational steps 400 for generating an I/O request are complete at step 465 and processing returns to step 315 of FIG. 3.

FIG. 5 illustrates a Command Block field layout example 500 for a Command Block 501. The purpose of a Command Block is to identify the command to be executed and the data on which the command will operate. Key fields in the Command Block 501, for example, include the command to be executed as identified in the command code 510, the data destination is identified by the destination SG address pointer field 520, and the data source is identified by the source SG address pointer fields 530 comprised of n fields 531–532. Note that the size of a Command Block, the specific fields, field locations, and field sizes illustrated in the example Command Block 501 are for example purposes only and other configurations and sizes are considered within the scope of the present invention. The Command Block 501 can be a fixed number of fields or variable number of fields depending on the total number of scatter/gather address pointers 520 and 530.

The Command Code field 510 contains a unique code for each of a predetermined set of commands. The types of commands can include, but are not limited to, Initialize, Copy, Direct Memory Access (DMA) Read, DMA Write, XOR, Verify, Compare, and Error Correction Code (ECC) Check. Details of each command and the operation of each command are beyond the scope of the present discussion and are disclosed in the document or documents cited in the above identified section titled "Related Applications."

The destination SG address pointer 520 is an address that identifies the location of a destination Scatter/Gather List. The destination Scatter/Gather List contains the address and byte count of data locations where the results of a given data operation should be placed. The destination SG address pointer 520 is accompanied by a Destination Count field 521 that identifies the number of destination addresses and byte counts that exist in the destination Scatter/Gather List. The number of destination addresses and byte counts are known generically as elements of a Scatter/Gather List.

The source SG address pointers 530 are addresses that identify the location of respective source Scatter/Gather Lists. The number of source Scatter/Gather Lists in the Command Block 501 are identified in the Source Count field 540. Each source Scatter/Gather List contains an address and byte count of source data being used as input to a given data operation carried on by the CI 155. Each data source pointer 531–532 is accompanied by a Source Scatter/Gather Count field 541–542 that identifies the number of elements in each source Scatter/Gather List.

The Command Chaining field 514 is a single bit used to indicate that the present command can be chained with at least one subsequent command thereby reducing the number of command complete interrupts generated by the CI 155. Typically, when the CI 155 completes a given data operation, an interrupt is generated to notify the local processor 121 that a given data operation has completed successfully. If the bit in the Command Chaining field 514 is set for the data operation identified in the present Command Block 501, then an interrupt is generated when the operation is complete. However, if the bit in the Command Chaining field 514 is clear, then no command complete interrupt is generated and the CI 155 proceeds to the next data operation. Two ways command chaining can be useful are to tell the CI 155 that at least one additional command is available for execution on the Command Queue 276, and to reduce the number of command complete interrupts generated by the CI 155.

FIG. 6 illustrates a detailed example of Scatter/Gather List fields 600 in a Scatter/Gather List 601. The purpose of a Scatter/Gather List is to identify the data source and data destination of a given data operation. In the example Scatter/Gather List 601, there are n elements 610, 620–630 where an element includes key fields that include, but are not limited to, an address 611 and a byte count 612. The byte count field 612 represents the number of bytes of data at the location of the address 611. A zero value in a byte count field indicates an unused element in the Scatter/Gather List.

No distinction is made between a destination Scatter/Gather List and a source Scatter/Gather List without knowing which field in Command Block 501 points to which Scatter/Gather List 601. However, only destination addresses are included in a destination Scatter/Gather List and only source addresses are included in a source Scatter/Gather List. Note that the size of any Scatter/Gather List and the specific fields therein, and the field locations and field sizes in the example Scatter/Gather List 601 are for example purposes only. The number of elements in the destination Scatter/Gather List is a function of the CI 155 word size and/or the number of bits allocated for a count field. Word size and/or count field size can limit the magnitude of the numbers that can be represented to numbers such as 13, 32, 64 or 128 for example. Other configurations and sizes are possible and are considered within the scope of the present invention.

Figure 7:
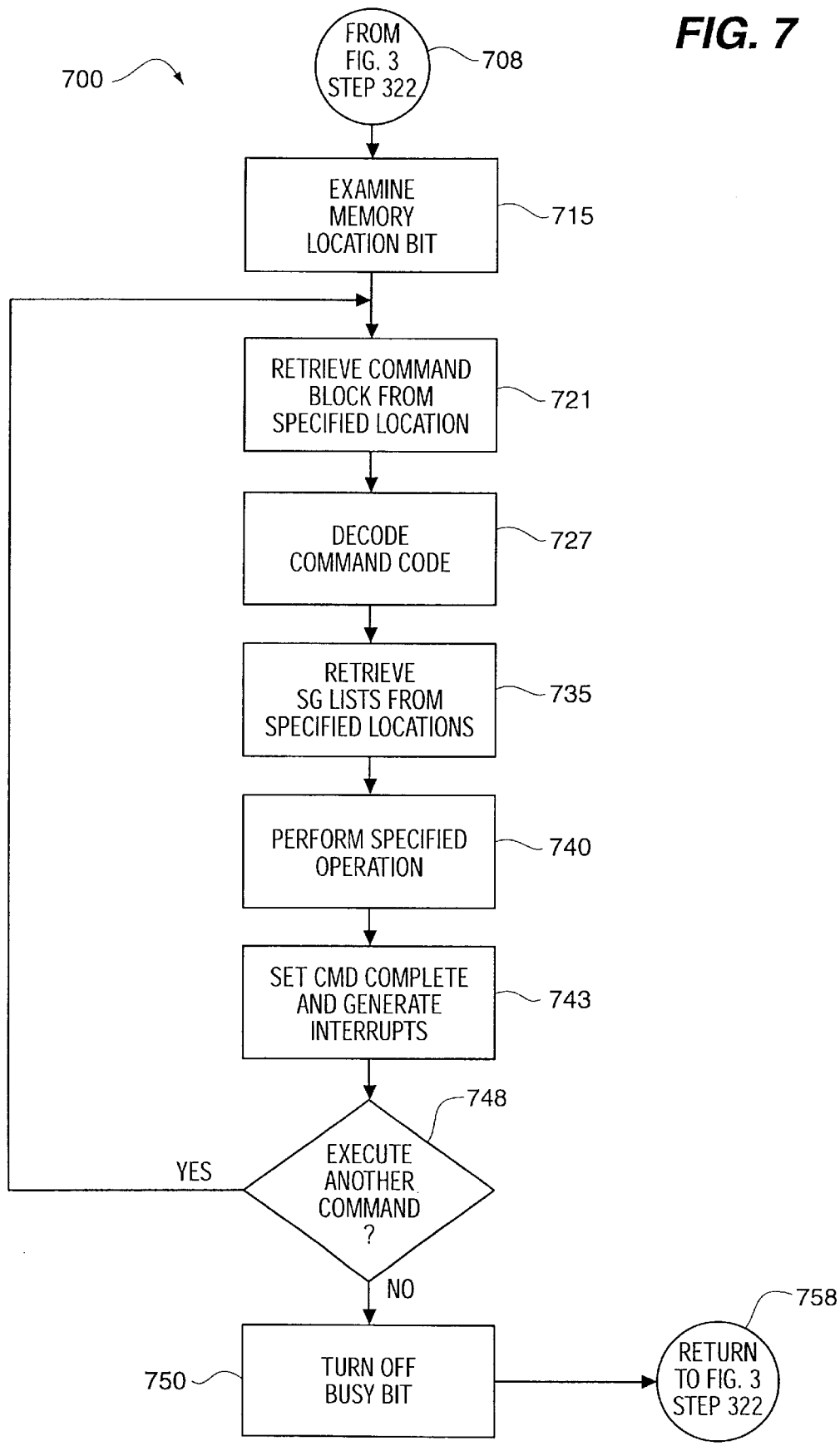
FIG. 7 illustrates an overview of the operational steps taken by the CI to retrieve a Command Block and execute an I/O request.
Figure 8:
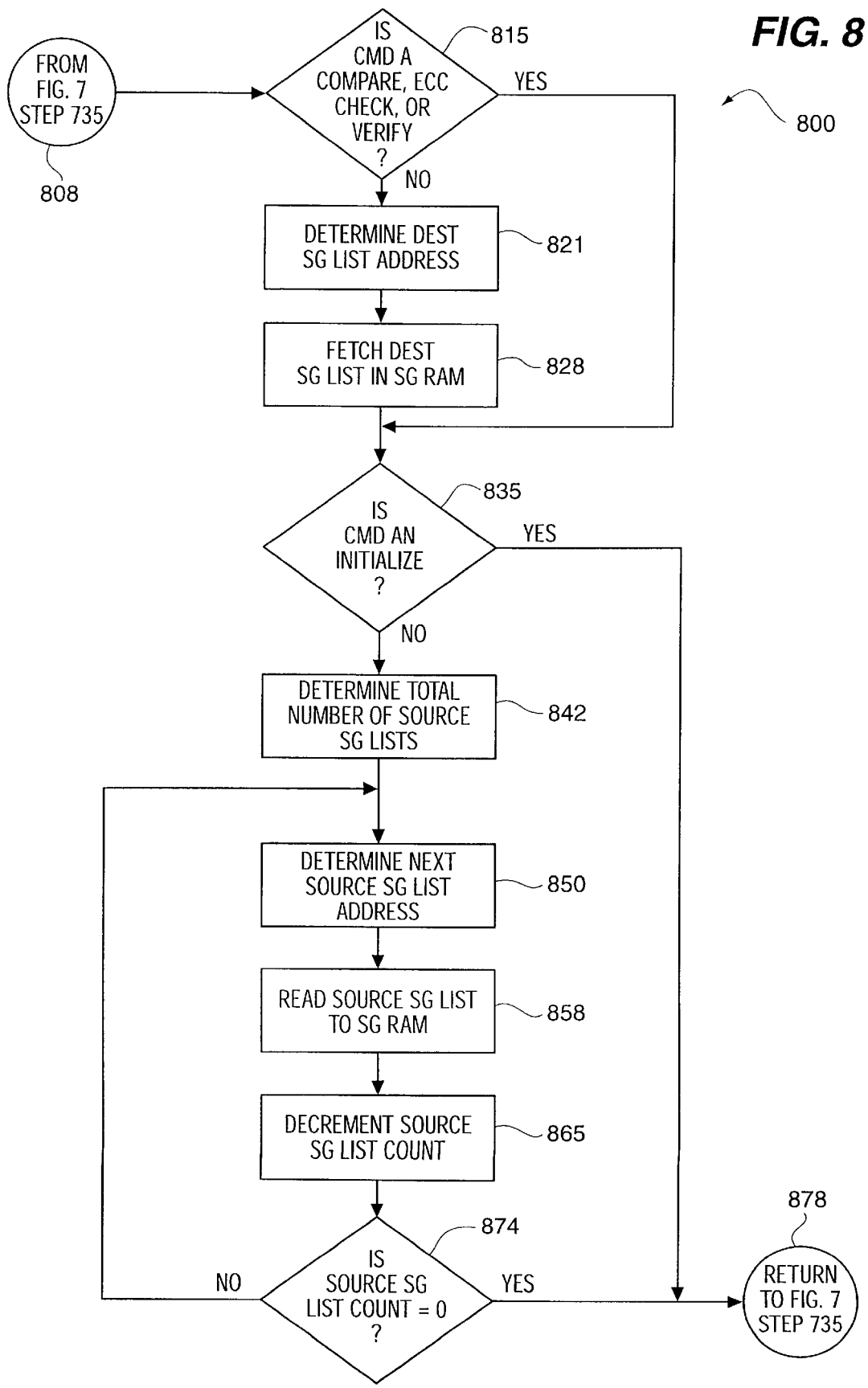
FIG. 8 illustrates the operational steps for locating and loading a source and/or destination Scatter/Gather List into a memory local to the CI.

I/O Request Execution Setup—FIGS. 7–8

FIGS. 7–8 illustrate the details of the CI 155 operational steps that are taken to set up an I/O request for execution. Specifically, FIG. 7 illustrates an overview of the operational steps 700 taken by the CI 155 to set up and execute an I/O request in response to the local processor 121 placing the address of a Command Block 501 into the Command Queue 276. The operational steps 700 begin at step 708 and are the details of step 322 in FIG. 3.

At step 715, the CI 155 examines the Memory Location bit in the Command Location register 272 to determine whether the Command Block 501 and corresponding Scatter/Gather Lists 601 are located in a memory local to the CI 155 or in a memory external to the CI 155. The location determination is made in view of the Memory Location bit being set or cleared.

At step 721, the CI 155 retrieves an address of a Command Block 501 from the Command Queue 276 and moves the Command Block contents from the specified address to the Command Block Registers 230 within the CI 155. The addresses 277–278 in Command Queue 276 are preferably retrieved in FIFO order.

At step 727, the command code 510 of Command Block 501 is decoded to identify the specific operation that is the subject of the present I/O request task that the CI 155 is to execute. Each one of a plurality of commands is identified by a unique combination of a plurality of bits that comprise the command code 510 field. The number of commands that can be represented by the command code 510 field is limited by the number of unique combinations that can be represented by the plurality of bits that comprise the command code 510 field.

At step 735, the address of each source and/or destination Scatter/Gather List 601 is retrieved in turn from the Command Block Registers 230 as the corresponding Scatter/Gather Lists themselves are moved from the specified address locations to the scatter/gather RAM 240. Details of retrieving a Scatter/Gather List 601 is disclosed in the text accompanying FIG. 8.

At step 740, a specific task is performed that is the substance of the command identified in step 727. Depending on which command was identified in step 727, the CI 155 logic is designed to perform different tasks and/or sub-tasks under the control of State Machine 260 in cooperation with other of the logic blocks 230–270 within CI 155. Details of the variety of steps performed by the CI 155 for each unique command identified by a given command code 510 are beyond the scope of the present discussion.

At step 743, the CI 155 sets the Command Complete bit in the Interrupt Source register 271, and generates an interrupt for the local processor 121 depending on the state of the command chaining bit 514 for the just completed command as previously disclosed in the text accompanying FIG. 5. The type of interrupt generated depends on whether the command completed successfully without an error or unsuccessfully with an error. In general at decision step 748, processing will continue at step 721 for a just executed command that completed successfully without an error. However, processing will continue for a just executed command that completed unsuccessfully with an error only after the CI 155 is expressly restarted by the local processor 121 by setting the Recovery bit in the Recovery register 274. Note that while the CI 155 is halted due to an error, the local processor 121 can remove a command from the Command Queue 276 as necessary in response to the error.

Alternatively, if it is determined at decision step 748 that no additional commands are in the Command Queue 276 for execution by the CI 155, then the Busy bit in the CI Status register 931 is turned off at step 750. Turning off the Busy bit means that there are no commands available to fetch and execute from the Command Queue 276. Processing then continues at step 758 by returning to step 322 of FIG. 3.

Types of errors that can occur during command execution and the error interrupts that the CI 155 can generate in response to each type of error can include, but are not limited to, the list set forth below.

Verify Error—If during execution of a Verify command a "1" is detected in the data pattern being verified, the CI 155 sets a Verify Error bit in the Interrupt Source register 271 and the CI 155 halts. An address of the specific location of the error or an address in the vicinity of the error, is placed in the Error Address register 275. Similarly, a verify error can occur during execution of a Compare command. For example, if during the read of the last source data the result of the Compare command's XOR operation contains a "1" in the previously accumulated data, then the CI 155 sets the Verify Error bit in the Interrupt Source register 271 and the CI 155 halts. An address of the specific location of the error or an address in the vicinity of the error, is placed in the Error Address register 275.

CI ECC Check Fail—If during execution of an ECC_Check command multiple un-correctable ECC errors are detected in the data pattern being checked, or if during execution of any other command a data read causes multiple un-correctable ECC errors, the CI 155 sets the ECC Check Fail bit in the Interrupt Source register 271 and the CI 155 halts. Similarly, if the address of a Command Block from the Command Queue 276 does not agree with the Memory Location bit in the Command Location register 272, then the CI 155 sets the Programming Error bit in the Interrupt Source register 271 and the CI 155 halts. An address of the specific location of the error or an address in the vicinity of the error, is placed in the Error Address register 275.

Programming Error—A programming error can occur in the context of any command being executed by the CI 155. For example, if during execution of a DMA read or write operation it is determined that the contents of the source count field 540 in Command Block 501 is not equal to 1, the CI 155 sets the Programming Error bit in the Interrupt Source register 271 and the CI 155 halts.

Illegal Command—If the command code field 510 of a given Command Block 501 contains a code that does not identify a known command, the CI 155 sets the Illegal Command bit in the Interrupt Source register 271 and the CI 155 halts.

Bad Address Error—If, for example, a device on either bus 140,141, or 156 fails to respond to an addressed request from CI Interface 250, then the CI 155 sets the Bad Address bit in the Interrupt Source register 271 and the CI 155 halts. An address of the specific location of the error or an address in the vicinity of the error, is placed in the Error Address register 275.

FIG. 8 illustrates the operational steps 800 for locating and loading a source and/or destination Scatter/Gather List 601 into I/O controller memory 157 local to the CI 155. The operational steps 800 begin at step 808 and are the details of step 735 in FIG. 7. One purpose of operational steps 800 is to retrieve the actual Scatter/Gather Lists pointed to by the Command Block 501 into a fast directly accessible memory local to the CI 155. Note that the Scatter/Gather Lists originate in either a local memory or an external memory as indicated by the Memory Location bit in the Command Location register 272 as previously disclosed.

If it is determined at decision step 815 that the decoded command code 510 indicates that the command of the present Command Block 501 is either a Compare, ECC Check, or Verify command, then no destination Scatter/Gather List exists and processing continues at step 835. Alternatively, if it is determined at decision step 815 that the decoded command code 510 indicates that the command of the present Command Block 501 is not a Compare, ECC Check, or Verify command, then a destination Scatter/Gather List exists and processing continues at step 821. At step 821 the destination Scatter/Gather List address pointer 520 is retrieved from the immediate Command Block 501. At step 828, the destination Scatter/Gather List 601 is retrieved from the designated location and loaded into memory 157 local to the CI 155.

If it is determined at decision step 835 that the decoded command code 510 is an Initialize command, then no source Scatter/Gather List exists and processing continues at step 878. Alternatively, if it is determined at decision step 835 that the decoded command code 510 is not an Initialize command, then processing continues at step 842 to begin a loop to fetch at least one source Scatter/Gather List into memory local to the CI 155. At step 842, the total number of source Scatter/Gather Lists 530 is determined by reading the Source Count field 540 from the Command Block 501. At step 850, the address of the next source Scatter/Gather List is retrieved from the Command Block 501. At step 858, a copy of the next source Scatter/Gather List is moved from its origin to I/O controller memory 157 local to the CI 155. The source Scatter/Gather List count is decremented by one and if it is determined at decision step 874 that the source Scatter/Gather List count is not zero, then processing continues to loop at step 850 as previously disclosed. Alternatively, if it is determined at decision step 874 that the source Scatter/Gather List count is equal to zero, then processing continues at step 878 by returning to step 735 of FIG. 7.

Figure 9:
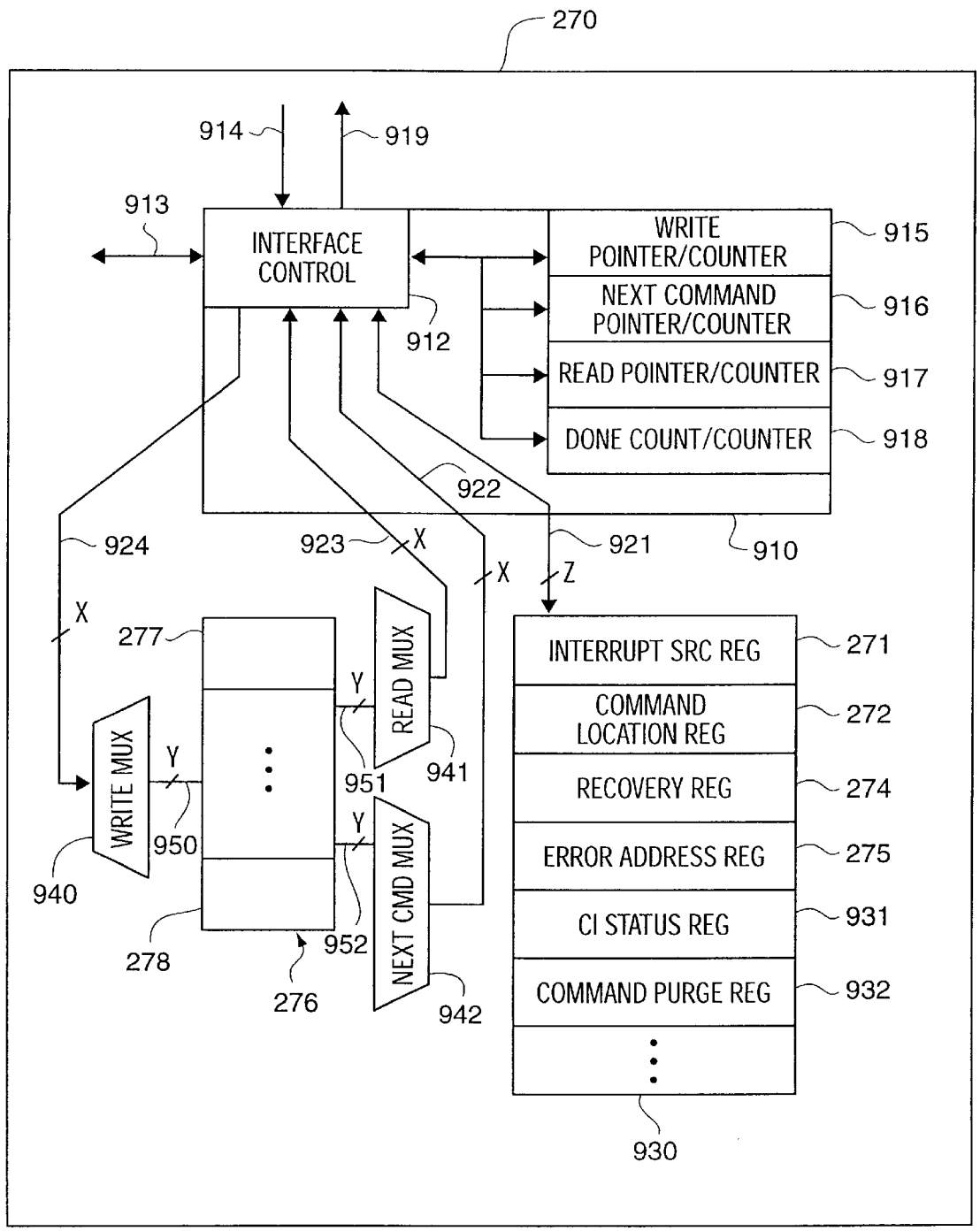
FIG. 9 illustrates the Command Queuing System component details in block diagram form.

Command Queuing System Architecture—FIG. 9

FIG. 9 illustrates the architectural details of the Command Queuing System 270 in block diagram form. The Command Queuing System 270 includes a Register Interface 910, a Command Queue 276, and a plurality of Control Registers 930.

The Register Interface 910 contains the registers and gated logic for components that include, but are not limited to, an Interface Control 912, Command Queue Pointer/Counters 915–917, and a Done Count/Counter 918. The Command Queue Pointer/Counters 915–917 include a Write Pointer/Counter 915, a Next Command Pointer/Counter 916, and a Read Pointer/Counter 917, each for use in managing accurate access to information in and out of the Command Queue 276. The Done Count/Counter 918 is used to count the number of completed commands that reside in the Command Queue 276. The present value of the Done Count resides in the CI Status register 931. Interface Control 912 is a non-processor interface to the controlling host software that detects and routes input to and output from the Command Queuing System 270 by way of host input lead 914 and host output lead 919. The Interface Control 912 is also communicatively connected to the CI State Machine 260 by way of state machine lead 913.

Command Queue 276 is a set of y Command Queue Registers 277–278 that each contain the address of a Command Block 501 for a corresponding command that is either queued for execution and/or waiting for acknowledgment following command completion. Command Queue Pointer/Counters 915–917 cycle through and point to various ones of the Command Queue Registers 277–278 during the operational steps for Command Queuing System 270 as disclosed in the text accompanying FIGS. 10–14. Each Command Queue Pointer/Counter 915–917 is associated with a corresponding multiplexer (MUX) 940–942. The write MUX 940 is used to write to a specific one of the Command Queue Registers 277–278 that is pointed to by the Write Pointer/Counter 915. The write MUX 940 accepts input from the set of x leads 924 and directs the input to one of the Command Queue Registers 277–278 by way of a selected set of y leads 950. The read MUX 941 is used to read from a specific one of the Command Queue Registers 277–278 that is pointed to by the Read Pointer/Counter 916. The read MUX 941 directs the contents of a selected one of the Command Queue Registers 277–278 by way of a selected set of y leads 951, to the Interface Control 912 by way of the set of x leads 923. The next command MUX 942 is used to read from a specific one of the Command Queue Registers 277–278 that is pointed to by the Next Command Pointer/Counter 916. The next command MUX 941 directs the contents of a selected one of the Command Queue Registers 277–278 by way of a selected set of y leads 952, to the Interface Control 912 by way of the set of x leads 922.

The plurality of Control Registers 271–275 and 931–932 contain specific information related to specific aspects of general CI 155 operation. The Interrupt Source register 271 includes bit positions for reporting a variety of error interrupt types including, but not limited to, Command Complete, Verify error, ECC Check Fail, Programming error, Illegal Command, and Bad Address error as previously disclosed in the text accompanying FIG. 7. The Command Location register 272 is a read/write register that includes bit positions for use in controlling the operation of CI 155 including, but not limited to, a Memory Location bit. The Recovery register 274 includes a Recovery bit position for use by local processor 121 to communicate to CI 155 that further command processing and execution may proceed. Once the CI 155 is halted due to the occurrence of one of the errors disclosed in the text accompanying FIG. 7, the CI 155 will only continue to execute a new command from the Command Queue 276 once the Recovery bit is set. The Error Address register 275 is used to hold the address of a command that corresponds to the error reported in the Interrupt Source register 271.

The CI Status register 931 includes status bit positions for use in controlling CI 155 and local processor 121 activities. Status bit positions include, but are not limited to, CI Busy bit, Command Queue Full bit, Done Count bits, and ToDo count bits. The Busy bit is set during the time when the CI 155 is executing a command from the Command Queue 276. The Busy bit is clear when all commands in the Command Queue 276 are complete or the CI 155 is halted due to an error. The Full bit is set when the Command Queue 276 is full of either commands awaiting execution and/or completed commands awaiting acknowledgment of being completed. The Done Count bits are a binary representation of the number of commands that the CI 155 has executed. In the event of an error, the Done Count identifies the number of commands completed and the command causing the error. The ToDo count bits represent the number of un-executed commands in the Command Queue 276 that are awaiting execution.

The Command Purge register 932 includes bits used to indicate the number of commands to pop or purge from the Command Queue 276 to properly reset the Command Queue 276 and its pointers 915–917 following recovery from an error.

Command Queuing System Operational Steps—FIGS. 10–14

FIGS. 10–14 illustrate interleaved segments of the Command Queuing System operational steps in flow diagram form. The interleaved segments include actions and responses taken by the local processor 121, also known as the host device, in concert with the actions and responses taken by the Command Queuing System 270 itself and the CI 155.

Figure 10:
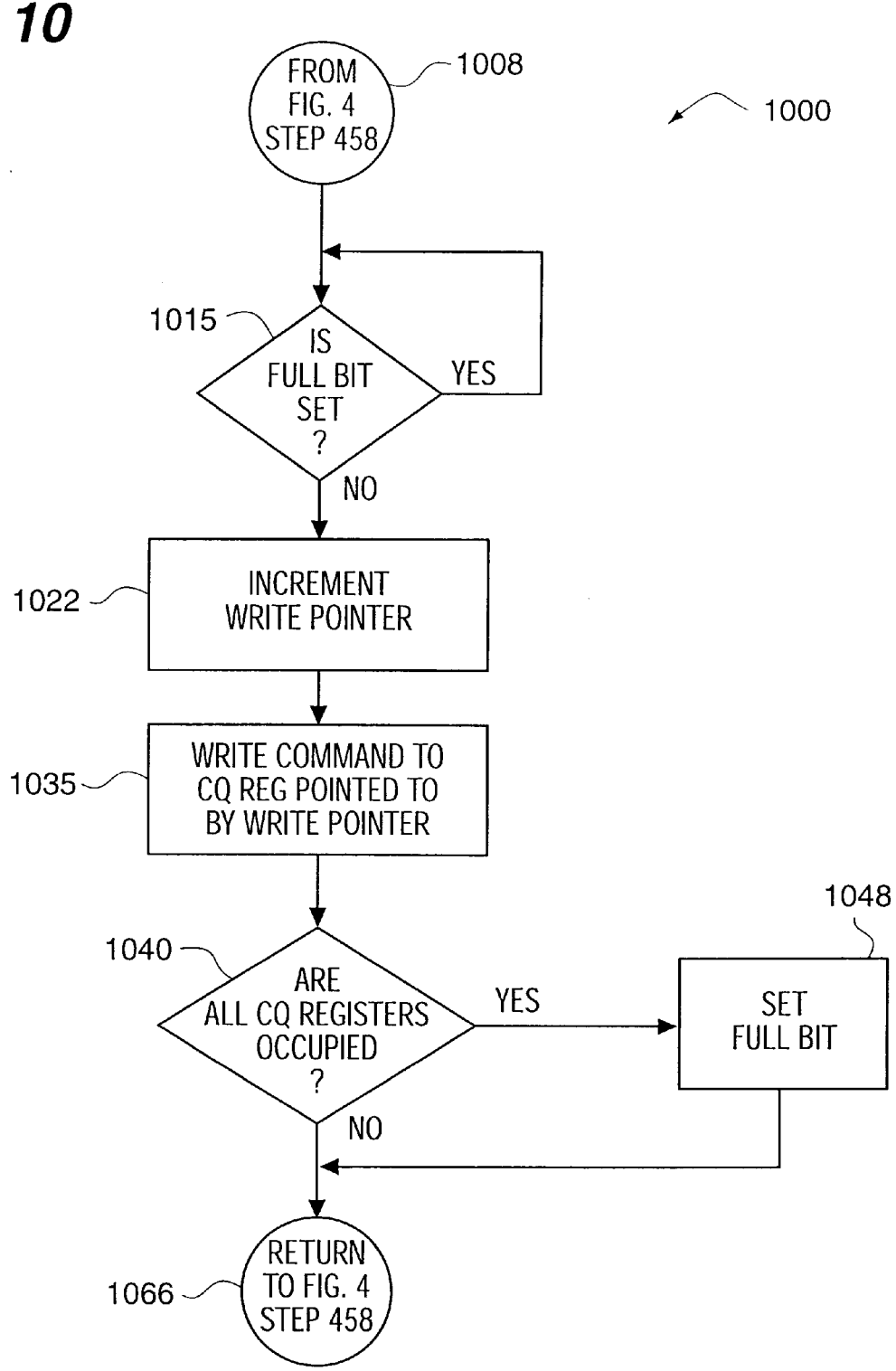
FIG. 10 illustrates the operational steps for the Command Queuing System in flow diagram form.

FIG. 10 illustrates an overview of the operational steps 1000 for the Command Queuing System 270 in flow diagram form. The operational steps 1000 begin at step 1008 and are the details of step 458 from FIG. 4 that relate to the local processor 121 writing a discrete command to the Command Queue 276.

If it is determined at decision step 1015 by the local processor 121 that the Full bit is set, then the local processor 121 waits at step 1015 and does not attempt to write a Command Block address to the Command Queue 276. Alternatively, if it is determined at decision step 1015 by the local processor 121 that the Full bit is not set, then the local processor 121 is free to write a Command Block address to the Command Queue 276 beginning at step 1022.

At step 1022, the Write Pointer/Counter 915 is incremented to point to the next available register in the Command Queue 276 that is ready to accept a new Command Block address. At step 1035, the local processor 121 writes the address of a Command Block 501 to the Command Queue 276 by way of the Command Queue Interface Control 912. The local processor 121 always writes its Command Block addresses to the same Command Block Address Register, however, the Command Queue Interface Control 912 redirects the destination of the incoming Command Block address to an appropriate one of the plurality of Command Queue Registers 277–278 that is pointed to by the Write Pointer/Counter 915 that controls lead selection for write MUX 940. The Write Pointer/Counter 915 always points to the next available register in the Command Queue 276 that is ready to accept a new Command Block address.

If it is determined at decision step 1040 by the Command Queue Interface Control 912 that the plurality of Command Queue Registers 277–278 are now occupied, then processing continues at step 1048. An occupied Command Queue register means that the register contains either an address of a Command Block for a command that has not yet been executed, or the register contains an address of a Command Block for an already executed command that is awaiting acknowledgment from the local processor 121. At step 1048, the Full bit is set to indicate that all registers in the Command Queue 276 are occupied and processing continues at step 1066. Alternatively, if it is determined at decision step 1040 by the Command Queue Interface Control 912 that all of the plurality of Command Queue Registers 277–278 are not occupied, then processing continues at step 1066.

Figure 11:
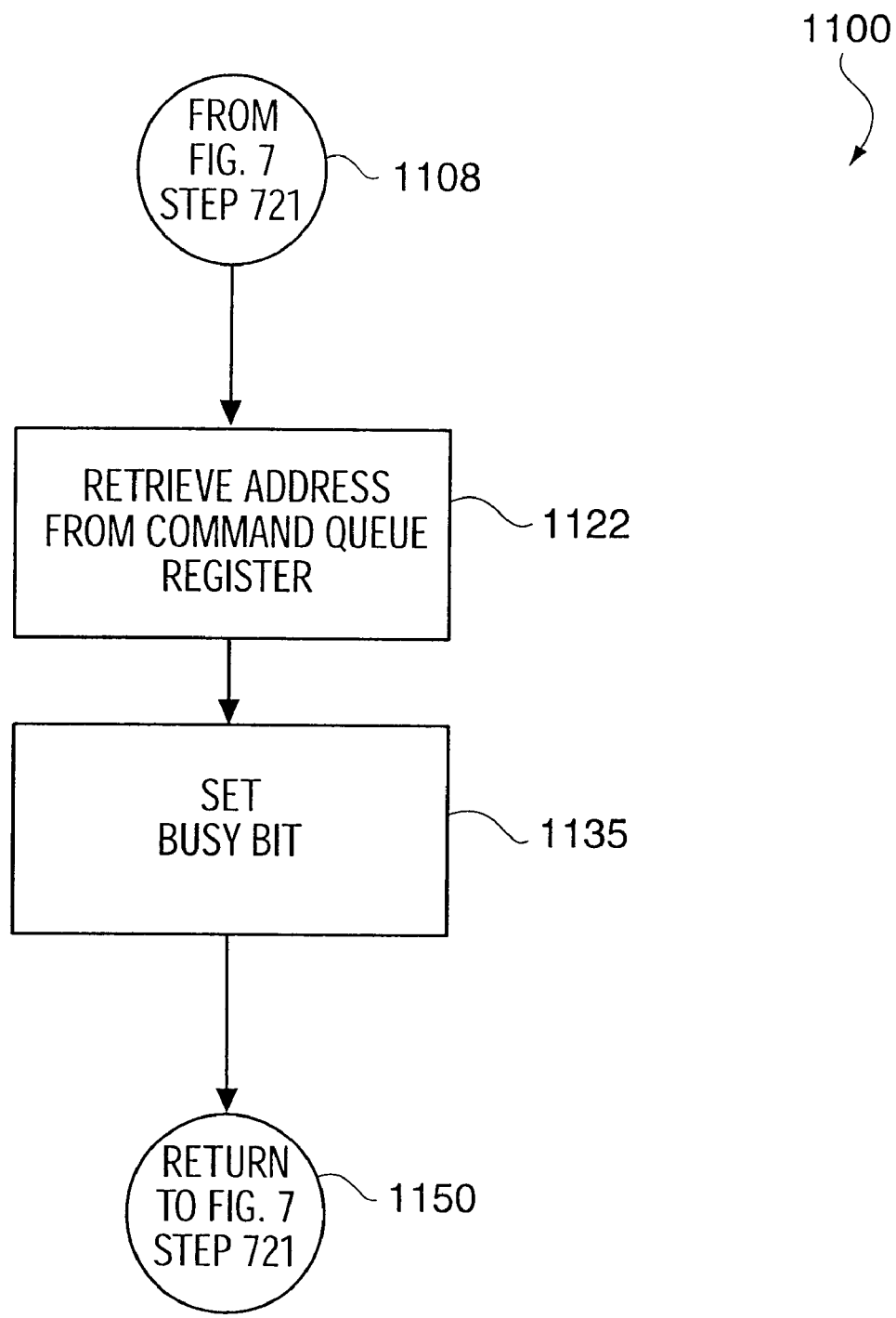
FIG. 11 illustrates the command fetching and executing details in flow diagram form.

FIG. 11 illustrates an overview of the operational steps 1100 for the Command Queuing System 270 in flow diagram form. The operational steps 1100 begin at step 1108 and are the details of step 721 from FIG. 7 that relate to the CI 155 fetching and executing the next command pointed to by the Next Command Pointer/Counter 916.

At step 1122, a next Command Block address is retrieved from one of the plurality of Command Queue Registers 277–278 that is pointed to by the Next Command Pointer/Counter 916. The next Command Block address is retrieved from the Command Queue 276 by way of the next command MUX 942 as previously disclosed. At step 1135 the Busy bit is set to indicate that the CI is presently executing at least one command. New Command Block address fetching is complete at step 1150 and processing returns to step 721 of FIG. 7.

Figure 12:
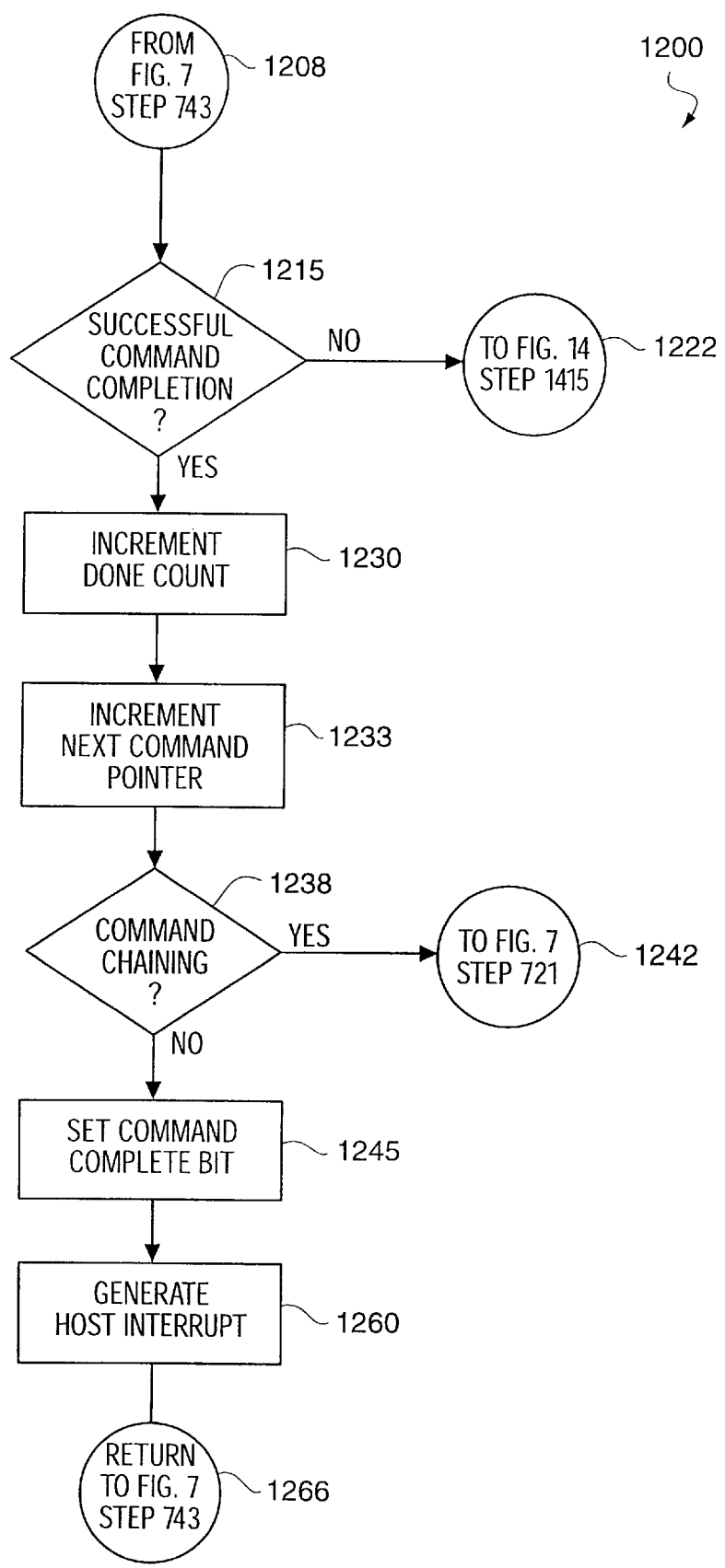
FIG. 12 illustrates the operational steps for successful and unsuccessful command completion by the CI in flow diagram form.

FIG. 12 illustrates an overview of the operational steps 1200 for the Command Queuing System 270 in flow diagram form. The operational steps 1200 begin at step 1208 and are the details of step 743 from FIG. 7 that relate to the successful or unsuccessful completion of a command by the CI 155.

Figure 14:
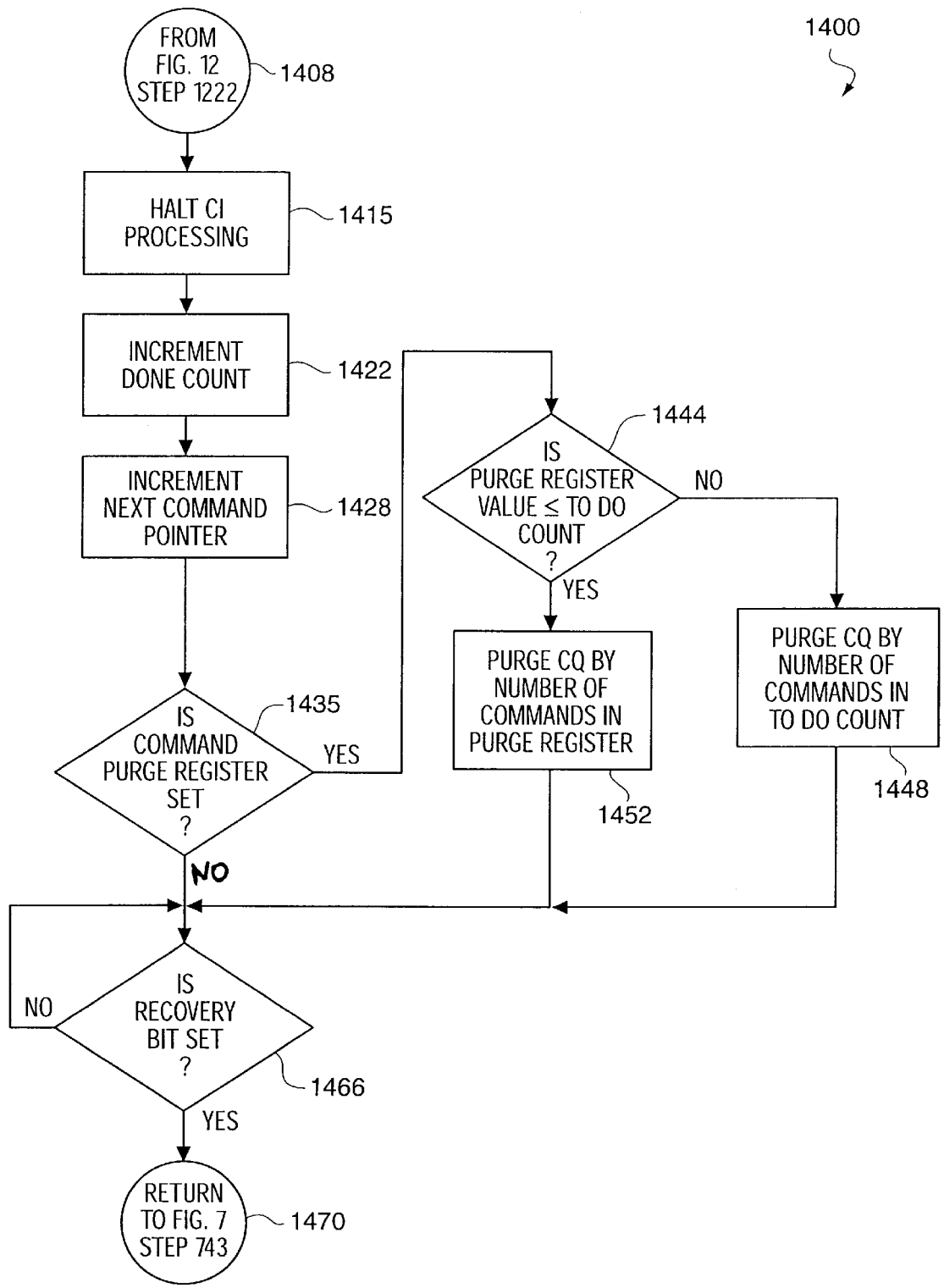
FIG. 14 illustrates the unsuccessful command completion and cleanup operational steps from the CI perspective in flow diagram form.

If it is determined at decision step 1215 by the CI State Machine 260 that the immediate command being executed has not completed successfully, then CI 155 error recovery processing proceeds as disclosed in the text accompanying FIG. 14. Alternatively, if it is determined at decision step 1215 by the CI State Machine 260 that the immediate command being executed has completed successfully, then processing continues at step 1230.

At step 1230, the Done Count/Counter 918 increments the Done Count of the CI Status register 931 to account for another successfully completed command, and the resulting incremented value is stored in the CI Status register 931. At step 1233, the Next Command Pointer/Counter 916 is incremented to point to the next available Command Block address in the Command Queue 276 that is associated with a command that has not yet been executed.

If it is determined at decision step 1238 by the CI State Machine 260 that the Command Chaining bit is set in the Command Block 501 of the just completed command, then at step 1242 processing continues at step 721 of FIG. 7 to execute the next command in the Command Queue 276 without generating a command complete interrupt. Alternatively, if it is determined at decision step 1238 by the CI State Machine 260 that the Command Chaining bit is not set in the Command Block 501 of the just completed command, then processing continues at step 1245.

At step 1245, the Command Complete bit is set in the Interrupt Source register 271 to indicate that a command is complete. At step 1260 an interrupt is generated by the CI 155 to notify the local processor 121 that at least one command has completed. The interrupt may be generated at the end of a single command or at the end of a plurality of chained commands depending if the Command Chaining bit is set as determined at step 1238. Processing continues at step 1266 by returning to step 743 in FIG. 7.

Figure 13:
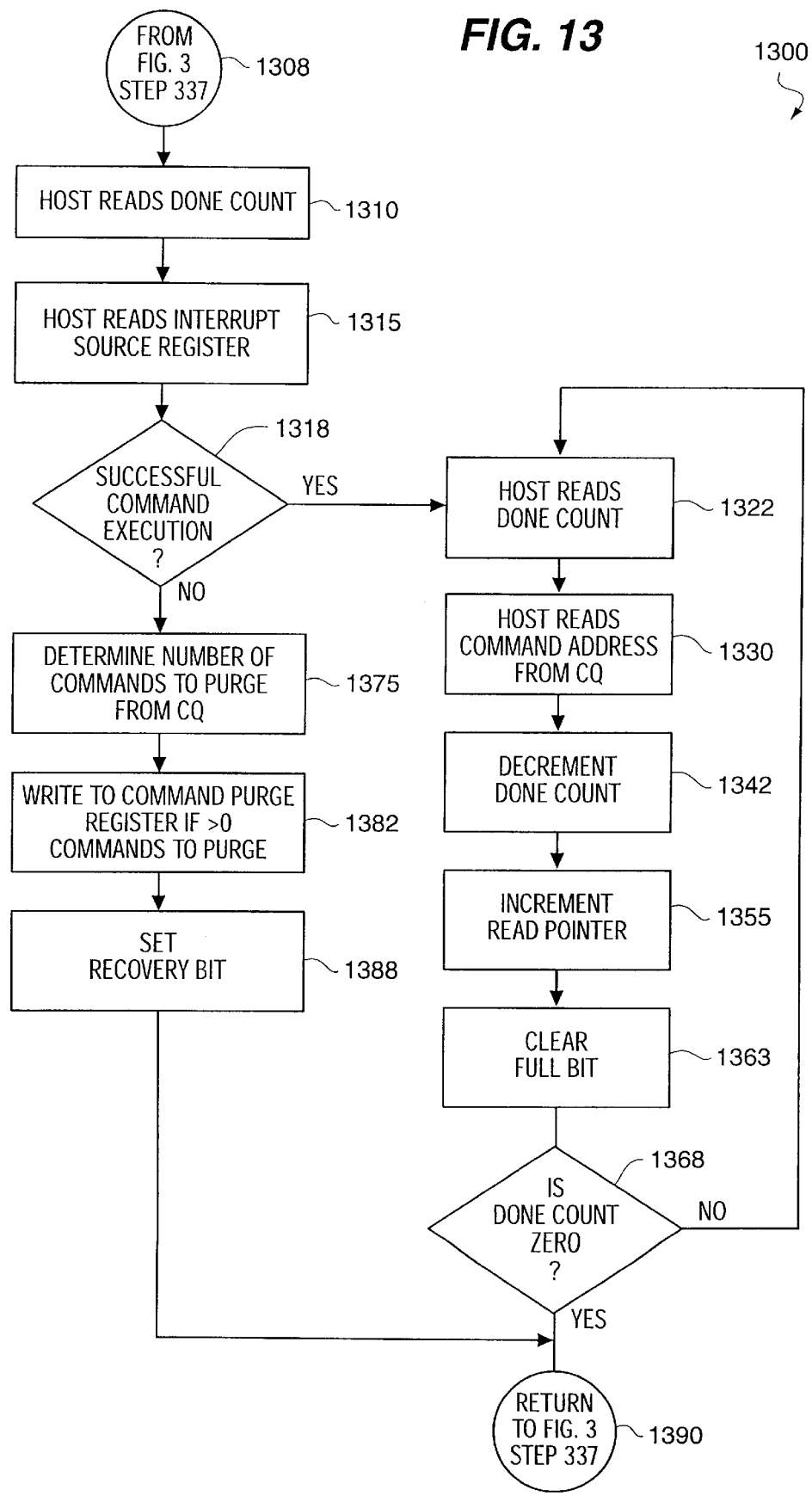
FIG. 13 illustrates the successful and unsuccessful command completion operational steps from the local host processor perspective in flow diagram form.

FIG. 13 illustrates an overview of the operational steps 1300 for the Command Queuing System 270 in flow diagram form. The operational steps 1300 begin at step 1308 and are the details of step 337 from FIG. 3 that relate to the successful and/or unsuccessful completion of a command by the CI 155 from the perspective of the local processor 121.

At step 1310, the local processor 121 reads the Done Count from the CI status register 931 so that the local processor 121 knows how many commands have been completed since the last interrupt was generated by the CI 155.

At step 1315, the local processor 121 reads the Interrupt Source register 271 of the Command Queuing System 270 to determine the type of interrupt that was generated by the CI 155. If it is determined at decision step 1315 that only the Command Complete bit is set in the Interrupt Source register 271, then all command have completed successfully and processing continues through the series of steps 1322–1368 for a number of times equal to the Done Count. Alternatively, if it is determined at decision step 1315 that only an Error bit is set in the Interrupt Source register 271, then one command has completed unsuccessfully with an error and error processing continues at step 1375. As one final alternative, if it is determined at decision step 1315 that both the Command Complete bit and an Error bit are set in the Interrupt Source register, then at least one of a series of commands has executed successfully and the last of the series of commands executed unsuccessfully. In this situation, the processing continues through the series of steps 1322–1368 for a Done Count–1 number of times before proceeding to the error processing steps beginning with step 1375.

At step 1322, the local processor 121 reads the Done Count from the CI Status register 931 so the local processor 121 knows how many commands have been completed since the last time the Done Count had been checked. Note that more than one command may have been completed prior to the time the CI 155 generated the last command complete interrupt and the local processor 121 last responded to the interrupt. At step 1330, the local processor 121 reads the fixed address of the Command Queue 276 to retrieve the next command to acknowledge from the Command Queue 276. Specifically, the register contents that is read is the contents of one of the Command Queue Registers 277–278 that is pointed to by the Read Pointer/Counter 917 as controlled by the Command Queue Interface Control 912. At step 1342, the Done Count is decremented by the Done Count/Counter 918 in response to the local processor 121 reading the Interrupt Source register 271 to indicate that a command completion has been acknowledged. The Read Pointer/Counter 917 is also incremented at step 1355 to point to the next register that contains a command that needs acknowledging. At step 1363, the Full bit is cleared even if it may not have previously been set because at least one command has been acknowledged and the local processor 121 can proceed to write another Command Block address to the Command Queue 276 as needed.

If it is determined by the local processor 121 at decision step 1368 that the Done Count is zero, then there are not additional completed commands to acknowledge and processing continues at step 1390 by returning to step 337 of FIG. 3. Alternatively, if it is determined by the local processor 121 at decision step 1368 that the Done Count is not zero, then there are additional completed commands to acknowledge and local processor 121 continues acknowledging the remaining number of commands indicated in the Done Count until the Done Count is zero. The local processor 121 can return to step 1330 to acknowledge additional completed commands if the local processor 121 maintains its own copy of the Done Count that was read in step 1322. However, if the local processor 121 does not maintain its own copy of the Done Count that was read in step 1322, then the local processor 121 processing can continue at step 1322 by reading the CI 155 maintained Done Count again and again to acknowledge additional completed commands until the Done Count read is equal to zero.

At step 1375, the local processor 121 determines the number of commands, if any, that must be purged from the Command Queue 276 in view of the immediate command that has completed unsuccessfully. One reason the local processor 121 may choose to purge one or more commands from the Command Queue 276 in view of an unsuccessful command completion is because commands in the Command Queue 276 that ordinarily follow the unsuccessfully completed command might depend on the product of each preceding command if the entire chain of commands is to successfully complete some larger task. Thus, the remaining commands in a chain of commands may need to be purged and then resubmitted to the Command Queue 276 for CI 155 execution at a later time as a complete whole. Specific reasons for purging commands are known only to the local processor 121 and are of no concern to the Command Queuing System 270. The address of the unsuccessful command that caused the error can be read by the local processor 121 from the Error Address register 275.

At step 1382, if the number of commands that must be purged from the Command Queue 276 is greater than zero, the number of commands to purge is written by the local processor 121 to the Command Purge register 932 in the CI 155 for the CI 155 to act upon in due course as disclosed in the text accompanying FIG. 14. At step 1388, the local processor 121 has completed the necessary operational steps that follow an unsuccessful command completion, so that the Recovery bit can be set in the Recover register 274. Setting the Recovery bit signals the CI 155 to proceed with its processing. Processing for the local processor 121 continues at step 1390 by returning to step 337 in FIG. 3.

FIG. 14 illustrates an overview of the operational steps 1400 for the Command Queuing System 270 in flow diagram form. The operational steps 1400 begin at step 1408 and are the details of step 1222 from FIG. 12 that relate to steps taken by the CI 155 in view of an unsuccessful command completion.

At the time a command execution error is detected, all CI 155 processing halts at step 1415. At step 1415, the Done Count is incremented by the Done Count/Counter 918 to count the unsuccessfully executed command among the number of completed commands. At step 1428, the Next Command Pointer/Counter 916 is incremented by one to account for the unsuccessfully completed command.

If it is determined at decision step 1435 by the Command Queue Interface Control 912 that the Command Purge register 932 has been written to, then processing continues at step 1444. Alternatively, if it is determined at decision step 1435 by the Command Queue Interface Control 912 that the Command Purge register 932 has not been written to, then processing continues at step 1466.

If it is determined at decision step 1444 that the value in the Command Purge register 932 is not less than or equal to the ToDo Count in the CI Status register 931, then processing continues at step 1448. At step 1448, the contents of a number of registers 277–278 in the Command Queue 276 are purged beginning with the register pointed to by the next command pointer 916 and continuing through the number of registers equal to the value of the ToDo Count. In other words, the Command Queue 276 and its pointers 915–917 are reset to an initial start state for the queue. The ToDo count is a calculated value that is updated in a manner consistent with changes to the Write Pointer/Counter 915 and the Next Command Pointer/Counter 916. The ToDo count value is the difference between the Write Pointer/Counter 915 and the Next Command Pointer/Counter 916. The ToDo count value is always available but is only valid when the CI 155 is halted due to an error.

Alternatively, if it is determined at decision step 1444 that the value in the Command Purge register 932 is less than the ToDo Count in the CI Status register 931, then processing continues at step 1452. At step 1452, the contents of a number of registers 277–278 in the Command Queue 276 are purged beginning with the register pointed to by the next command pointer 916 and continuing through the number of registers equal to the value of the Command Purge register 932. All pointers 915–917 for Command Queue 276 are updated according to the number of commands purged from the queue. From either of steps 1452 or 1448, processing continues at step 1466.

If it is determined at decision step 1466 that the Recovery bit has not been set by the local processor 121, then the CI 155 remains halted at step 1466. Alternatively, if it is determined at decision step 1466 that the Recovery bit has been set by the local processor 121, then processing continues at step 1470 by returning to normal processing at step 743 in FIG. 7.

CONCLUSION

The present invention is a hardware based non-processor driven Command Queuing System in a hardware accelerated I/O data processing engine that manages the order of commands being executed and acknowledged for completion absent of software or processor control. Although specific embodiments are disclosed herein, it is expected that persons skilled in the art can and will design alternative CI systems that are within the scope of the following claims either literally or through the Doctrine of Equivalents.

What is claimed is:

1. A command queuing system in a hardware accelerated data processing engine corresponding to a local host processor, said system comprising:
    a command queue interface;
    a command queue comprised of a plurality of command queue registers addressable by said command queue interface wherein said plurality of command queue registers store addresses of commands;

a plurality of control registers for operation of said data processing engine and communication with said local host processor by way of said command queue interface; and an autonomous configuration of registers and gated logic absent any controlling software for detecting a new command address being written into said command queue, selecting one of said command addresses in said command queue responsive to said detection of said new command address, executing a command stored at one of said command addresses, and generating an acknowledgment that said command is completed responsive to completion of said command.

2. A system according to claim 1 wherein said command queue interface includes:

an interface control to direct primary command queuing system operations;

a plurality of multiplexers to direct access to and from specific ones of said plurality of command queue registers; and a plurality of command queue pointer/counters to select specific ones of said plurality of command queue registers for reading and writing in said command queue.

3. A system according to claim 2 wherein said plurality of command queue pointer/counters include:

a write pointer/counter to point to an appropriate one of said plurality of command queue registers that is available next to receive a command address;

a next command pointer/counter to point to an appropriate one of said plurality of command queue registers that contains a next command to execute; and a read pointer/counter to point to an appropriate one of said plurality of command queue registers that contains an address of a completed command.

4. A system according to claim 1 wherein said autonomous configuration of registers and gated logic includes:

a completion register for distinguishing a successful command completion from an unsuccessful command completion; and circuitry for updating said command queue and said command queue pointer/counters in response to said unsuccessful command completion.

5. A system according to claim 4 wherein said autonomous configuration of registers and gated logic includes:

circuitry for purging contents of at least one of said plurality of command queue registers in response to a purge value from said local host processor; and a done count/counter for indicating which said command that was executing during said unsuccessful command completion.

6. A system according to claim 4 wherein said circuitry for updating includes:

circuitry for generating and transmitting an interrupt to said local host processor indicative of at least one command completion selected from at least one of a group consisting of: said successful command completion and said unsuccessful command completion;

circuitry for halting said command queuing system in response to an occurrence of said unsuccessful command completion;

circuitry for restarting said command queuing system that is halted only in response to a restart stimulus being received from said local host processor; and circuitry for updating said command queue and said plurality of command queue pointer/counters to point to appropriate ones of said plurality of command queue registers in said command queue responsive to receiving said restart stimulus.

7. A method for operating a command queuing system in a hardware accelerated data processing engine corresponding to a local host processor using an autonomous configuration of registers and gated logic absent any controlling software, said method comprising:

establishing a command queue interface;

generating a command queue comprised of a plurality of command queue registers addressable by said command queue interface;

configuring a plurality of control registers for operation of said data processing engine and communication with said local host processor by way of said command queue interface;

receiving an address of a command in said command queue transmitted by said local host processor;

detecting said address being received in said command queue;

selecting a one of said command queue registers responsive to said detecting of said address;

executing a command stored at an address in said one of said command queue registers; and transmitting an acknowledgment responsive to a completion of said command.

8. A method according to claim 7 wherein said step of establishing said command queue interface includes:

operating an interface control to direct primary command queuing system operations in a manner that includes a plurality of multiplexers to direct access to and from specific ones of said plurality of command queue registers, and a plurality of command queue pointer/counters to select specific ones of said plurality of command queue registers for reading and writing in said command queue.

9. A method according to claim 8 wherein said step of operating said interface control includes:

maintaining a write pointer/counter to point to an appropriate one of said plurality of command queue registers that is available next to receive a command address;

maintaining a next command pointer/counter to point to an appropriate one of said plurality of command queue registers that contains a next command to execute; and maintaining a read pointer/counter to point to an appropriate one of said plurality of command queue registers that contains an address of a completed command.

10. A method according to claim 7 wherein said step of managing includes:

distinguishing a successful command completion from an unsuccessful command completion; and updating said command queue and said command queue pointer/counters in response to said unsuccessful command completion.

11. A method according to claim 10 wherein said step of updating includes:

purging contents of at least one of said plurality of command queue registers in response to a purge value from said local host processor; and identifying a command that was executing during said unsuccessful command completion.

12. A method according to claim 10 wherein said step of updating includes:

generating an interrupt for said local host processor indicative of at least one command completion selected from at least one of a group consisting of: said successful command completion and said unsuccessful command completion;

halting said command queuing system in response to an occurrence of said unsuccessful command completion;

restarting said command queuing system that is halted only in response to a restart stimulus from said local host processor; and updating said command queue and said plurality of command queue pointer/counters to point to appropriate ones of said plurality of command queue registers in said command queue.

13. A command queuing system in a hardware accelerated data processing engine absent any controlling software, said system comprising:

a command queue interface;

a command queue comprised of a plurality of command queue registers addressable by said command queue interface;

a plurality of control registers for operation of said data processing engine and communication with a local host processor by way of said command queue interface;

means for detecting a write of a command address by said local host processor to said command queue;

means for initiating execution of a next command from said command queue in response to said means for detecting;

means for distinguishing a successful command completion from an unsuccessful command completion;

means for notifying said local host processor of said successful command completion and said unsuccessful command completion;

means for identifying which command is complete on demand from said local host processor; and means for updating said command queue and command queue pointer/counters in response to said successful command completion and said unsuccessful command completion.

14. A system according to claim 13 wherein said command queue interface includes:

an interface control to direct primary command queuing system operations;

a plurality of multiplexers to direct access to and from specific ones of said plurality of command queue registers; and a plurality of command queue pointer/counters to select specific ones of said plurality of command queue registers for reading and writing in said command queue.

15. A system according to claim 14 wherein said plurality of command queue pointer/counters include:

a write pointer/counter to point to an appropriate one of said plurality of command queue registers that is available next to receive a command address;

a next command pointer/counter to point to an appropriate one of said plurality of command queue registers that contains a next command to execute; and a read pointer/counter to point to an appropriate one of said plurality of command queue registers that contains an address of a completed command.

16. A system according to claim 13 wherein said means for updating includes:

means for purging contents of at least one of said plurality of command queue registers in response to a purge value from said local host processor; and means for identifying a command that was executing during said unsuccessful command completion.

17. A system according to claim 13 wherein said means for updating includes:

means for halting said command interpreter in response to an occurrence of said unsuccessful command completion; and means for restarting said command interpreter that is halted only in response to a restart stimulus from said local host processor.

* * * * *